United States Patent
Seo et al.

(10) Patent No.: US 9,883,468 B2
(45) Date of Patent: Jan. 30, 2018

(54) POWER CONTROL METHOD FOR GUARANTEEING QUALITY OF SERVICE OF DEVICE TO DEVICE DIRECT COMMUNICATION AND APPARATUS THEREFOR

(71) Applicants: LG ELECTRONICS INC., Seoul (KR); RESEARCH & BUSINESS FOUNDATION SUNGKYUNKWAN UNIVERSITY, Suwon-si, Gyeonggi-do (KR)

(72) Inventors: Hanbyul Seo, Anyang-si (KR); Hojin Song, Yuseong-gu (KR); Jongyeol Ryu, Jung-gu (KR); Dongin Kim, Seongnam-si (KR); Byounghoon Kim, Anyang-si (KR); Wan Choi, Seoul (KR)

(73) Assignees: LG ELECTRONICS INC., Seoul (KR); RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 107 days.

(21) Appl. No.: 14/901,603

(22) PCT Filed: Nov. 22, 2013

(86) PCT No.: PCT/KR2013/010674
§ 371 (c)(1),
(2) Date: Dec. 28, 2015

(87) PCT Pub. No.: WO2015/005541
PCT Pub. Date: Jan. 15, 2015

(65) Prior Publication Data
US 2016/0142986 A1    May 19, 2016

Related U.S. Application Data

(60) Provisional application No. 61/845,338, filed on Jul. 11, 2013, provisional application No. 61/901,444, filed on Nov. 8, 2013.

(51) Int. Cl.
*H04W 52/38* (2009.01)
*H04W 52/36* (2009.01)
*H04W 4/00* (2009.01)

(52) U.S. Cl.
CPC ......... *H04W 52/383* (2013.01); *H04W 4/005* (2013.01); *H04W 52/367* (2013.01)

(58) Field of Classification Search
CPC .. H04W 52/383; H04W 4/005; H04W 52/367
See application file for complete search history.

(56) References Cited

U.S. PATENT DOCUMENTS

| 2005/0068918 A1* | 3/2005 | Mantravadi | .......... H04B 7/0669 370/328 |
| 2006/0203713 A1* | 9/2006 | Laroia | ..................... H04L 5/023 370/209 |

(Continued)

FOREIGN PATENT DOCUMENTS

| KR | 10-2013-0065002 A | 6/2013 |
| KR | 10-2013-0065373 A | 6/2013 |

*Primary Examiner* — Dinh P Nguyen
(74) *Attorney, Agent, or Firm* — Birch, Stewart, Kolasch & Birch, LLP

(57) ABSTRACT

Disclosed is a method of controlling, by a device, power for guaranteeing the quality of service of a device to device (D2D) direct communication. In detail, the method comprises the steps of: receiving, from a base station, information containing at least one of channel information and information of a receiving side device in a D2D communication; estimating an uplink channel with the base station on the basis of the received information; and selecting a transmission power by comparing the channel gain value of the uplink channel with a threshold value for determining the maximum transmission power, and transmitting data to the base station using the selected transmission power, wherein the channel information comprises at least one of channel information of the D2D communication, uplink channel (Continued)

information between the device and the base station, and interference channel information between the device and the receiving side device in the D2D communication.

10 Claims, 2 Drawing Sheets

(56) References Cited

U.S. PATENT DOCUMENTS

| | | | |
|---|---|---|---|
| 2008/0031172 A1* | 2/2008 | Nanda | H04W 72/0426 370/310.1 |
| 2011/0103240 A1 | 5/2011 | Nasrabadi et al. | |
| 2012/0093098 A1 | 4/2012 | Charbit et al. | |
| 2012/0300662 A1* | 11/2012 | Wang | H04W 72/02 370/252 |
| 2013/0100994 A1* | 4/2013 | Merlin | H04L 1/0003 375/219 |
| 2013/0148637 A1 | 6/2013 | Yang et al. | |
| 2013/0150061 A1 | 6/2013 | Shin et al. | |
| 2014/0378150 A1* | 12/2014 | Li | H04W 76/023 455/450 |

* cited by examiner

POWER CONTROL METHOD FOR GUARANTEEING QUALITY OF SERVICE OF DEVICE TO DEVICE DIRECT COMMUNICATION AND APPARATUS THEREFOR

CROSS REFERENCE TO RELATED APPLICATIONS

This application is the National Phase of PCT International Application No. PCT/KR2013/010674, filed on Nov. 23, 2013, which claims priority under 35 U.S.C. 119(e) to U.S. Provisional Applications No. 61/845,338, filed on Jul. 11, 2013 and 61/901,444, filed on Nov. 8, 2013, all of which are hereby expressly incorporated by reference into the present application.

TECHNICAL FIELD

The present invention relates to device-to-device direct communication, and more particularly, to a power control method for assuring quality of service of device-to-device communication and an apparatus therefor.

BACKGROUND ART

Recently, the demand of radio data has been increased exponentially. In this respect, it is expected that the demand of radio data will exceed capacity that may be provided by a network based on the current cellular standard.

In order to solve this, a heterogeneous network (HetNet) based on a small cell is considered in a 3GPP LTE-A ($3^{rd}$ Generation Partnership Project Long Term Evolutio-Advanced) system, etc. The HetNet remarkably increases area capacity of a cell by distributing load of a macro cell and increasing a reuse rate of the macro cell as a pico cell, femto cell, a relay station and a distributed antenna system are distributed inside the macro cell depending on the situation.

Meanwhile, referring to FIG. 1, it is assumed that device-to-device (D2D) communication mutually coexists between a cellular user equipment 120, which transmits data to a base station through an uplink, and a user equipment which shares data with the cellular user equipment 120 by using the same uplink resource as that of the cellular user equipment 120. In this case, in order to assure quality of service (QoS) of the D2D communication, the cellular user equipment 120 controls intensity of interference on a D2D receiving user equipment 130 by transmitting data to a base station 110. In more detail, the cellular user equipment 120 transmits a signal by controlling a transmission power to allow intensity of interference to reach certain intensity or less. The transmission power is not greater than $P_{max}$ which is a maximum instantaneous power. Therefore, if intensity of a channel between the D2D receiving user equipment 130 and the cellular user equipment 120 is small, the cellular user equipment 120 can transmit data by increasing the transmission power. However, if intensity of the channel is great, the cellular user equipment 120 should transmit data by lowering the transmission power.

As described above, the cellular user equipment 120 transmits data such that intensity of interference on the D2D receiving user equipment 130 reaches a certain intensity or less for the following reason. The D2D receiving user equipment 130 uses a single user decoding (SUD) scheme for recovering data by regarding interference as noise when recovering its data. If the SUD scheme is used, intensity of interference is increased when the transmission power of the cellular user equipment 120 is increased, whereby performance of the D2D receiving user equipment 130 is degraded. Therefore, the cellular user equipment 120 should transmit data by lowering the transmission power to assure performance of D2D communication. As a result, loss in data transmission efficiency of the cellular user equipment 120 is caused.

DISCLOSURE

Technical Problem

Based on the aforementioned discussion, an object of the present invention is to provide a power control method for assuring quality of service of device-to-device direct communication and an apparatus therefor.

Technical Solution

In one aspect of the present invention, a power control method of a user equipment to assure quality of service of a device to device (D2D) communication comprises the steps of receiving, from a base station, information that includes at least one of channel information and information of a receiving side user equipment in a D2D communication; estimating an uplink channel on the basis of the received information; and selecting a transmission power by comparing a channel gain value of the uplink channel with a threshold value for determining a maximum transmission power, and transmitting data to the base station by using the selected transmission power, wherein the channel information includes at least one of channel information of the D2D communication, uplink channel information between the user equipment and the base station, and interference channel information between the user equipment and the receiving side user equipment in the D2D communication.

Preferably, the information of the receiving side user equipment in the D2D communication includes information on information recovery of the receiving side user equipment, and information in the receiving side user equipment is recovered through at least one of single user decoding (SUD) and successive interference cancellation (SIC).

More preferably, a transmission rate of data transmitted from the user equipment through an uplink is a maximum transmission rate or less when the information of the receiving side user equipment is recovered through SIC.

In another aspect of the present invention, a power control method of a user equipment to assure quality of service of a device to device (D2D) communication comprises the steps of receiving, from a base station, information as to a transmission power for transmitting data; and transmitting the data to the base station by using the transmission power, wherein the transmission power is a value selected by the base station by comparing a channel gain value of an uplink channel, which is calculated based on at least one of channel information and information of a receiving side user equipment in D2D communication, with a threshold value for determining a maximum transmission power, and the channel information includes at least one of channel information of the D2D communication, uplink channel information between the user equipment and the base station, and interference channel information between the user equipment and the receiving side user equipment in the D2D communication.

Preferably, the information of the receiving side user equipment in the D2D communication includes information on information recovery of the receiving side user equipment, and information in the receiving side user equipment is recovered through at least one of single user decoding (SUD) and successive interference cancellation (SIC).

Advantageous Effects

According to the embodiment of the present invention, when device-to-device communication and cellular communication coexist, quality of service (QoS) of device-to-device communication can be assured efficiently, and information efficiency of cellular communication can be maximized.

It will be appreciated by persons skilled in the art that that the effects that can be achieved through the present invention are not limited to what has been particularly described hereinabove and other advantages of the present invention will be more clearly understood from the following detailed description.

BEST MODE FOR CARRYING OUT THE INVENTION

Hereinafter, configurations, operations, and other features of the present invention will be understood readily by the preferred embodiments of the present invention, examples of which are illustrated in the accompanying drawings.

Figure 1:
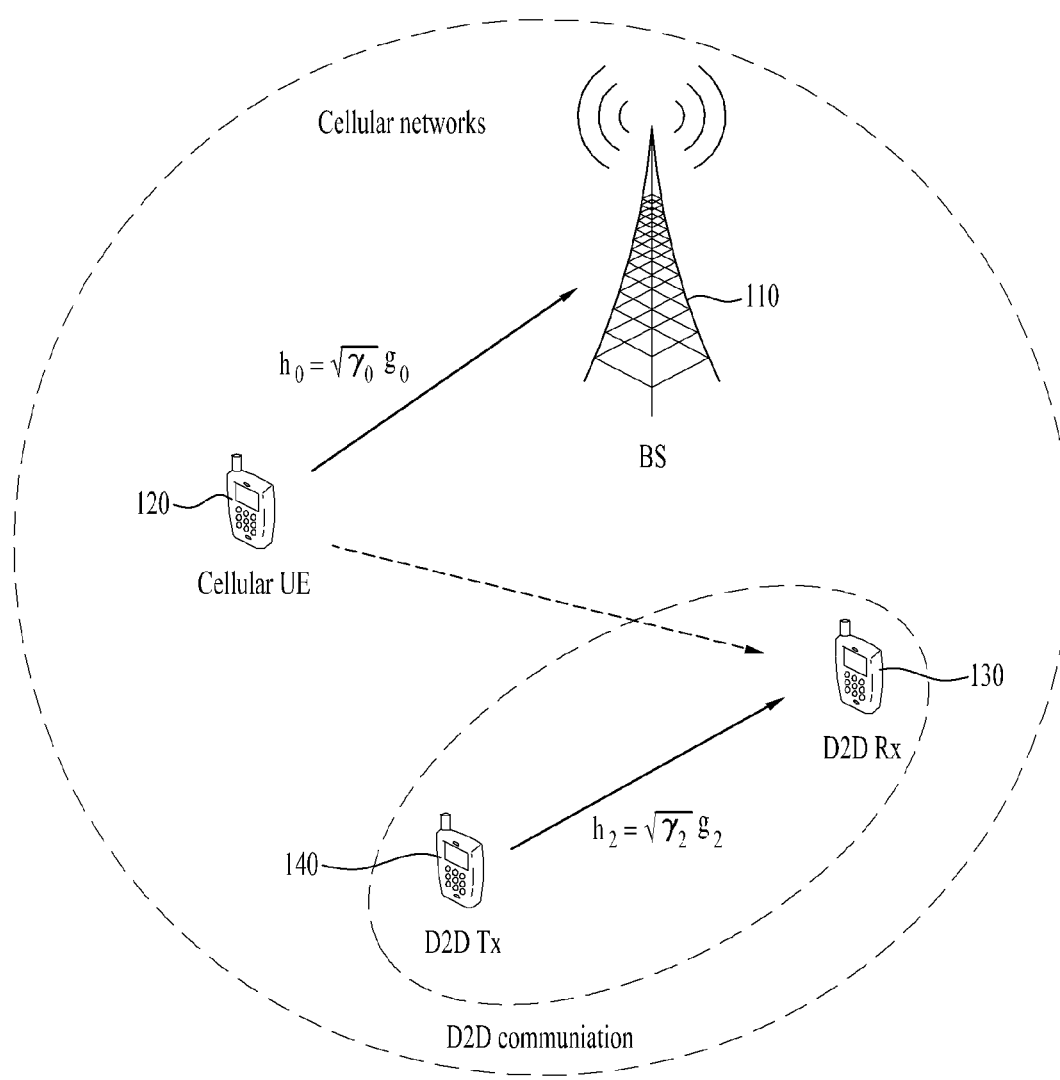
FIG. 1 is a diagram illustrating a communication system to which the present invention is applied.

FIG. 1 is a diagram illustrating a communication system to which the present invention is applied.

Referring to FIG. 1, a base station 110 allocates all or some of subframes used for uplink communication to D2D communication. In this case, interference may occur between a cellular user equipment 120 and a D2D receiving user equipment 130 through the subframes allocated to D2D communication. Meanwhile, D2D communication refers to communication based on a lower power between devices are located to adjoin each other. Therefore, it is assumed that interference on the base station 110 located to be relatively far away from the devices may be disregarded due to its small size. The present invention considers a power control method for maximizing transmission efficiency of a cellular user equipment 120, which performs communication through the same subframe as that of a D2D communication, while assuring QoS of the D2D communication.

The cellular user equipment 120 should control a power based on an uplink channel $h_0$ between the cellular user equipment 120 and the base station 110 and a channel $h_2$ between D2D transmitting and receiving terminals. It is assumed that each channel has long term statistic and short term fading as expressed by the following Equation 1.

$$h_0 = \sqrt{\gamma_0} g_0, h_1 = \sqrt{\gamma_1} g_1, h_2 = \sqrt{\gamma_2} g_2 \quad \text{[Equation 1]}$$

However, it is difficult for the cellular user equipment 120 to acquire perfect information of an interference channel to the D2D receiving user equipment 130 or a D2D communication channel. Therefore, it is required to consider a power control method based on long term statistic which is likely to be relatively acquired by the cellular user equipment 120. The long term statistic of the D2D communication channel may be acquired by the base station 110 through feedback between the base station 110 and the D2D transmitting and receiving terminals. The base station 110 may transmit the acquired long term statistic to the cellular user equipment 120. Also, interference channel long term statistic information may directly be acquired through a device discovery signal transmitted from the D2D receiving user equipment 130. Therefore, the base station 110 and the cellular user equipment 120 may acquire γ1 and γ2 which are long term statistics of a D2D transmitting/receiving terminal channel and an interference channel between the cellular user equipment 120 and the D2D receiving user equipment 130. On the other hand, it is assumed that the base station 110 and the cellular user equipment 120 may know perfect information of the uplink communication channel $h_0$ to the base station 110 through channel estimation.

It is assumed that the cellular user equipment 120 transmits information $s_0$ to the base station 110 through an uplink at a power of $P_0$ and a D2D transmitting user equipment 140 transmits the information $s_D$ to the D2D receiving user equipment 130 through the same subframe at the power of $P_D$. In this case, a receiving signal $r_0$ received by the base station 110 may be defined by the following Equation 2.

$$r_0 = h_0 \sqrt{P_0} s_0 + z_0 = \sqrt{\gamma_0} g_0 \sqrt{P_0} s_0 + z_0 \quad \text{[Equation 2]}$$

In this case, $z_0$ means additive white Gaussian noise (AWGN) at the base station 110. Also, a signal $r_D$ received by the D2D receiving user equipment 130 may be defined by the following Equation 3.

$$r_D = h_2 \sqrt{P_D} s_D + h_1 \sqrt{P_0} s_0 + z_D = \sqrt{\gamma_2} g_2 \sqrt{P_D} s_D + \sqrt{\gamma_1} g_1 \sqrt{P_0} s_0 + z_D \quad \text{[Equation 3]}$$

In this case, $z_D$ means AWGN at the D2D receiving user equipment 130. An uplink transmission rate from the receiving signal $r_0$ of the base station 110 may be derived as expressed by the following Equation 4.

$$R_0 = \log_2\left(1 + \frac{|h_0|^2 P_0}{\sigma^2}\right) = \log_2\left(1 + \frac{\gamma_0 |g_0|^2 P_0}{\sigma^2}\right) \quad \text{[Equation 4]}$$

The present invention considers an environment where the D2D receiving user equipment 130 can use an interference cancellation scheme, to overcome limitation of the existing scheme. It is assumed that the D2D receiving user equipment 130 can use successive interference cancellation (SIC) for recovering information of the D2D receiving user equipment 130 after removing an effect of interference from the receiving signal $r_D$ by first recovering interference information from the receiving signal $r_D$ in accordance with intensity of an interference signal, as well as a single user decoding (SUD) scheme for recovering information of the D2D receiving user equipment 130 by regarding interference at the receiving signal $r_D$ as noise.

In order that the D2D receiving user equipment 130 uses SIC, it is required to acquire several kinds of prior information.

First of all, the D2D receiving user equipment 130 should previously have prior information of a pilot signal or demodulation reference signal, which is used by the cellular user equipment 120. This pilot signal or demodulation reference signal is used to estimate an interference channel, and the D2D receiving user equipment 130 recovers information from the receiving signal on the basis of estimated channel information.

Next, the D2D receiving user equipment 130 should previously have codebook information on codewords transmitted from the cellular user equipment 120. The D2D receiving user equipment 130 can recover a codeword transmitted from the cellular user equipment 120 on the basis of the codebook.

The prior information described as above may be acquired through a small amount of information exchange at a step prior to information transmission. A transmission rate of D2D communication can be derived as expressed by the following Equation 4 in accordance with two types of schemes for recovering information in a D2D receiving user equipment 130.

$$R_D = \begin{cases} R_D^{SIC}, & \text{if } \log_2\left(1 + \frac{\gamma_1|g_1|^2 P_0}{\sigma^2 + \gamma_2|g_2|^2 P_D}\right) \geq R_0 \\ R_D^{SUD}, & \text{if } \log_2\left(1 + \frac{\gamma_1|g_1|^2 P_0}{\sigma^2 + \gamma_2|g_2|^2 P_D}\right) < R_0 \end{cases}$$ [Equation 5]

In this case, $R_D^{SIC}$ and $R_D^{SUD}$ mean transmission rates acquired through SIC scheme and SUD scheme, respectively.

Meanwhile, the SIC scheme may be performed when the D2D receiving user equipment 130 successfully recovers information of the cellular user equipment 120. Therefore, it is provided that a maximum transmission rate obtained when the D2D receiving user equipment 130 recovers interference should be greater than $R_0$. $R_D^{SIC}$ and $R_D^{SUD}$ may respectively be derived as expressed by the following Equation 6.

$$R_D^{SIC} = \log_2\left(1 + \frac{\gamma_2|g_2|^2 P_D}{\sigma^2}\right),$$ [Equation 6]

$$R_D^{SUD} = \log_2\left(1 + \frac{\gamma_2|g_2|^2 P_D}{\sigma^2 + \gamma_1|g_1|^2 P_0}\right)$$

In this case, $R_D^{SIC}$ is a transmission rate obtained after interference is removed from the receiving signal. Therefore, a portion corresponding to interference in the Equation is removed. On the other hand, $R_D^{SUD}$ is a transmission rate obtained when recovery is performed after interference is regarded as noise. Therefore, an effect of interference corresponds to a denominator of SINR (signal-to-interference plus noise ratio), whereby the transmission rate is reduced. If a size of interference is very great, the D2D receiving user equipment 130 may omit an operation for removing the interference channel and codewords of the cellular user equipment 120 from a receiving signal after recovering the same, and may lower complexity of recovery by using a method for decoding a transmitted signal and then removing the decoded signal from a receiving signal.

The present invention suggests a power control method for maximizing a transmission rate of a cellular user equipment 120 while assuring the probability of outage in D2D communication to reach a specific target outage probability r or less on the basis of channel gain of an uplink of the cellular user equipment 120 and long term statistic information of D2D channels, wherein the long term statistic information is already acquired. It is assumed that D2D communication always assures transmission of a transmission rate of R, and a case where the transmission rate of the D2D communication does not reach R is regarded that outage in communication occurs. Restriction for assuring the probability of outage in D2D communication to reach $\epsilon$ or less can be expressed by the following Equation 7.

$$Pr[R_D < R || h_0|^2 = x] \leq \epsilon$$ [Equation 7]

In this case, the power control method of the cellular user equipment 120, which maximizes a transmission rate of uplink communication while assuring the probability of outage in D2D communication, is obtained through an optimization matter as expressed by the following Equation 8.

$$P_0^* = \arg\max R_0$$

$$\text{s.t. } Pr[R_D < R || h_0|^2 = x] \leq \epsilon,$$

$$0 \leq P_0 \leq P_{max}$$ [Equation 8]

In this case, the last restricted equation means that a maximum instantaneous power of the cellular user equipment 120 does not exceed $P_{max}$. In this matter, since a log function is an increasing function related to a power, log function portions at $R_0$ and $R_D$ are removed and the log function is transposed into $\tau = 2^R - 1$, whereby the optimization matter may be modified into a simpler SINR optimization matter as expressed by the following Equation 9.

$$P_0^* = \arg\max \frac{|h_0|^2 P_0}{\sigma^2}$$ [Equation 9]

$$\text{s.t. } Pr[SINR_D < \tau || h_0|^2 = x] \leq \epsilon,$$

$$0 \leq P_0 \leq P_{max}$$

In this case, $SINR_D$ is given by two cases as expressed by the following Equation 10 on the assumption that the D2D receiving user equipment 130 recovers information by using SIC or SUD, or both of them.

$$SINR_D =$$ [Equation 10]

$$\begin{cases} SINR_D^{SIC} = \frac{\gamma_2|g_2|^2 P_D}{\sigma^2}, & \text{if } \frac{\gamma_1|g_1|^2}{\sigma^2 + \gamma_2|g_2|^2 P_D} \geq \frac{|h_0|^2}{\sigma^2} \\ SINR_D^{SUD} = \frac{\gamma_2|g_2|^2 P_D}{\sigma^2 + \gamma_1|g_1|^2 P_0}, & \text{if } \frac{\gamma_1|g_1|^2}{\sigma^2 + \gamma_2|g_2|^2 P_D} < \frac{|h_0|^2}{\sigma^2} \end{cases}$$

Since SINR of the D2D receiving user equipment 130 is determined depending on whether the D2D receiving user equipment 130 can successfully recover information of the cellular user equipment 120, the SINR is categorized into $SINR_D^{SIC}$ and $SINR_D^{SUD}$. Therefore, the SINR has the condition expressed by the above Equation 10.

Since SINR of the cellular user equipment 120 is a linear function of the transmission power $P_0$, the SINR is obtained by a maximum value of $P_0$ that simultaneously satisfies first and second restricted equations. In this case, a restricted equation that assures the probability of outage in communication of the D2D receiving user equipment 130 to reach $\epsilon$ or less is obtained differently depending on distribution of a given channel. The present invention suggests a power control method for the cellular user equipment 120 when a channel follows Rayleigh distribution, as one embodiment.

The probability of outage in communication, which considers the probability for recovering information using SIC and SUD in the D2D receiving user equipment 130, may be defined as expressed by the following Equation 11.

$$Pr[SINR_D < \tau \mid |h_0|^2 = x] = \quad \text{[Equation 11]}$$

$$Pr\left[\frac{\gamma_1|g_1|^2}{\sigma^2 + \gamma_2|g_2|^2 P_D} \geq \frac{|h_0|^2}{\sigma^2}, SINR_D^{SIC} < \tau\right] +$$

$$Pr\left[\frac{\gamma_1|g_1|^2}{\sigma^2 + \gamma_2|g_2|^2 P_D} < \frac{|h_0|^2}{\sigma^2}, SINR_D^{SUD} < \tau\right]$$

In this case, the first term means the probability of outage in communication when the D2D receiving user equipment 130 has used SIC. The second term means the probability of outage in communication when the D2D receiving user equipment 130 has used SUD. Therefore, the total probability of outage in communication is obtained by the sum of the probabilities of outage in communication when the two types of recovery schemes have been used.

First of all, the probability of outage in communication when the D2D receiving user equipment 130 has used SIC may be obtained through a double integral as expressed by the following Equation 12.

$$Pr\left[|g_1|^2 \geq \frac{(\sigma^2 + \gamma_2|g_2|^2 P_D)x}{\gamma_1 \sigma^2}, |g_2|^2 < \frac{\sigma^2 \tau}{\gamma_2 P_D}\right] = \quad \text{[Equation 12]}$$

$$\int_0^{\frac{\sigma^2 \tau}{\gamma_2 P_D}} \int_{\frac{(\sigma^2 + \gamma_2 w P_D)x}{\gamma_1 \sigma^2}}^{\infty} \exp(-v)\exp(-w)\,dv\,dw =$$

$$\frac{\gamma_1 \sigma^2}{\gamma_2 x P_D + \gamma_1 \sigma^2} \exp\left(-\frac{x}{\gamma_1}\right)\left(1 - \exp\left(-\frac{(\gamma_2 x P_D + \gamma_1 \sigma^2)\tau}{\gamma_2 \gamma_1 P_D}\right)\right)$$

In this case, the probability of outage in communication when the D2D receiving user equipment 130 has used SIC is obtained by the simultaneous probability of the probability that the D2D receiving user equipment 130 will use SIC and the probability that the D2D receiving user equipment 130 has used SIC.

Secondly, the probability of outage in communication when the D2D receiving user equipment 130 has used SUD may be derived.

FIG. 2 is a diagram illustrating the probability of outage in communication is schematized on a two-dimensional plane in accordance with one embodiment of the present invention.

Referring to FIG. 2, it is noted that the probability of outage in communication when the D2D receiving user equipment 130 has used SUD may be categorized into two cases depending on types of the probability schematized on the two-dimensional plane. In more detail, the probability may be categorized into the case where Line 1 and Line 2 have an intersection point and the case where Line 1 and Line 2 do not have an intersection point. Prior to description of the two cases, Line 1 and Line 2 on the plane shown in FIG. 2 may be defined as expressed by the following Equation 13.

Line 1: $\gamma_2 P_D x |g_2|^2 =$ [Equation 13]

$$\sigma^2 \gamma_1 |g_1|^2 - \sigma^2 x \left(\Leftarrow \frac{\sigma^2 \gamma_1 |g_1|^2}{\sigma^2 + \gamma_2 |g_2|^2 P_D} < x\right)$$

Line 2: $\gamma_2 P_D |g_2|^2 =$ $$\tau \gamma_1 |g_1|^2 + \tau \sigma^2 \left(\Leftarrow \frac{\gamma_2 |g_2|^2 P_D}{\sigma^2 + \gamma_1 |g_1|^2 P_0} < \tau\right)$$

1) The case where Line 1 and Line 2 do not have an intersection point

FIG. 2(*a*) illustrates that the probability of outage in communication when Line 1 and Line 2 have an intersection point is schematized. First of all, referring to FIG. 2(*a*), it is noted that Line 1 and Line 2 do not have an intersection point. Since this case occurs when a slope of Line 2 is greater than or equal to that of Line 1, an interaction formula such as the following Equation 14 may be obtained.

$$\frac{\tau \gamma_1 P_0}{\gamma_2 P_D} \geq \frac{\sigma^2 \gamma_1}{\gamma_2 P_D x} \Rightarrow P_0 \geq \frac{\sigma^2}{\tau x} \quad \text{[Equation 14]}$$

The probability of outage in communication when the D2D receiving user equipment 130 has used SUD may be defined as expressed by the following Equation 15 from the above Equation 14 and the fact that distribution of channel gain of a Rayleigh fading channel follows exponential distribution.

$$Pr\left[\frac{\sigma^2 \gamma_1 |g_1|^2 P_0}{\sigma^2 + \gamma_2 |g_2|^2 P_D} < x, \frac{\gamma_2 |g_2|^2 P_D}{\sigma^2 + \gamma_1 |g_1|^2 P_0} < \tau\right] = 1 - \quad \text{[Equation 15]}$$

$$\exp\left(-\frac{\tau \sigma^2}{\gamma_2 P_D}\right)\frac{\gamma_2 P_D}{\tau \gamma_1 P_0 + \gamma_2 P_D} - \exp\left(-\frac{x}{\gamma_1}\right)\frac{\gamma_1 \sigma^2}{\gamma_1 \sigma^2 + \gamma_2 P_D x}$$

The probability of outage in communication when the D2D receiving user equipment 130 has used SUD is obtained by the simultaneous probability of the probability that the D2D receiving user equipment 130 will use SUD and the probability that the D2D receiving user equipment 130 has used SUD. Therefore, the total probability of outage in communication of the D2D receiving user equipment 130 can be obtained by the sum of the probability of outage in communication when the D2D receiving user equipment 130 has used SIC and the probability of outage in communication when the D2D receiving user equipment 130 has used SUD. The total probability of outage in communication may be defined as expressed by the following Equation 16.

$$Pr[SINR_D < \tau \mid |h_0|^2 = x] = 1 - \exp\left(-\frac{\tau \sigma^2}{\gamma_2 P_D}\right) \quad \text{[Equation 16]}$$

$$\left(\frac{\gamma_2 P_D}{\tau \gamma_1 P_0 + \gamma_2 P_D} + \exp\left(-\frac{x(1+\tau)}{\gamma_1}\right)\frac{\gamma_1 \sigma^2}{\gamma_2 x P_D + \gamma_1 \sigma^2}\right)$$

A transmission power for allowing the probability of outage in D2D communication not to exceed ϵ may be obtained using the above Equation 16 by a restricted equation such as the following Equation 17.

$$P_1 \leq P_{\epsilon,1} = \frac{\gamma_2 P_D}{\tau \gamma_1 (1-\epsilon)\exp\left(\frac{\tau \sigma^2}{\gamma_2 P_D}\right) - } - \frac{\gamma_2 P_D}{\tau \gamma_1} \quad \text{[Equation 17]}$$

$$\tau \gamma_1 \exp\left(-\frac{x(1+\tau)}{\gamma_1}\right)\frac{\gamma_1 \sigma^2}{\gamma_2 x P_D + \gamma_1 \sigma^2}$$

Therefore, in the case that Line 1 and Line 2 do not have an intersection point, a maximum transmission power of the cellular user equipment 120, which allows the probability of D2D communication not to exceed ϵ, becomes $P_{\epsilon,1}$.

2) The case where Line 1 and Line 2 have an intersection point

Figure 2A:
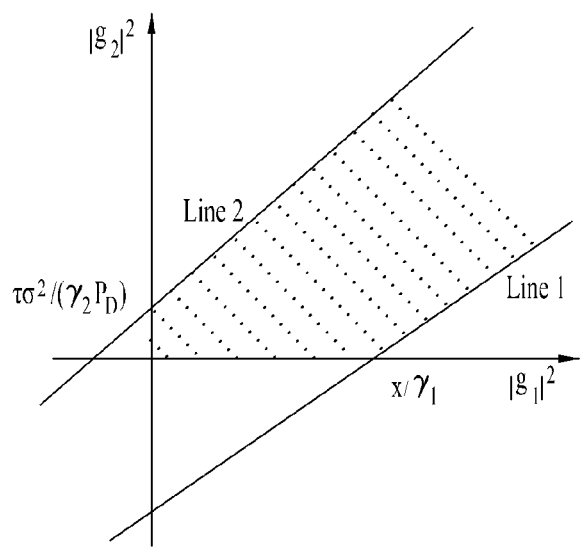
FIG. 2 is a diagram illustrating the probability of outage in communication is schematized on a two-dimensional plane in accordance with one embodiment of the present invention.
Figure 2B:
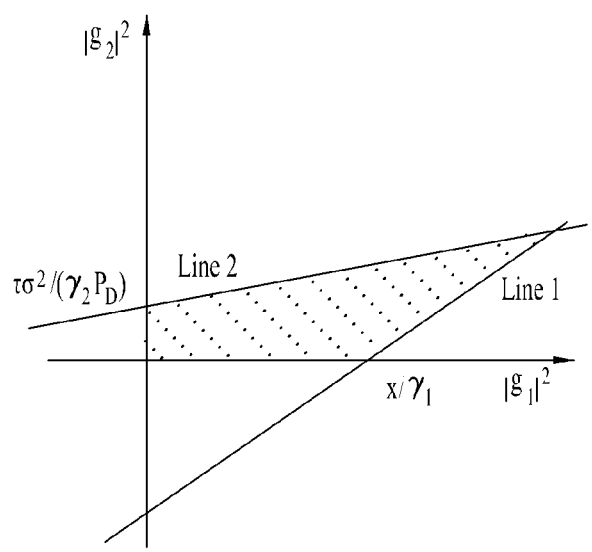

FIG. 2(b) illustrates that the probability of outage in communication when the D2D receiving user equipment 130 has used SUD is schematized when Line 1 and Line 2 have an intersection point. Referring to FIG. 2(b), it is noted that Line 1 and Line 2 have an intersection point. The probability of outage in communication when the D2D receiving user equipment 130 has used SUD is obtained through an integral equation such as the following Equation 18 from the fact that distribution of channel gain of a Rayleigh fading channel follows exponential distribution.

$$Pr\left[\frac{\sigma^2 \gamma_1 |g_1|^2}{\sigma^2 + \gamma_2 |g_2|^2 P_D} < x, \frac{\gamma_2 |g_2|^2 P_D}{\sigma^2 + \gamma_1 |g_1|^2 P_0} < \tau\right] =$$
$$\int_0^{\frac{x\sigma^2(1+\tau)}{\gamma_1(\sigma^2 - x\tau P_0)}} \int_0^{\frac{\tau\sigma^2 + \tau\gamma_1 P_0 w}{\gamma_2 P_D}} \exp(-v)\exp(-w)\,dv\,dw -$$
$$\int_{\frac{x}{\gamma_1}}^{\frac{x\sigma^2(1+\tau)}{\gamma_1(\sigma^2 - x\tau P_0)}} \int_0^{\frac{-x\sigma^2 + \gamma_1 \sigma^2 w}{\gamma_2 P_D x}} \exp(-v)\exp(-w)\,dv\,dw$$

[Equation 18]

The probability of outage in communication when the D2D receiving user equipment 130 has used SUD may be obtained using the above Equation 18.

The total probability of outage in communication of the D2D receiving user equipment 130 can be obtained by the sum of the probability of outage in communication when the D2D receiving user equipment 130 has used SIC and the probability of outage in communication when the D2D receiving user equipment 130 has used SUD. The total probability of outage in communication may be defined as expressed by the following Equation 19.

$$Pr[SINR_D < \tau \mid |h_0|^2 = x] = 1 - \exp\left(-\frac{\tau\sigma^2}{\gamma_2 P_D}\right)$$
$$\left(\frac{\gamma_1 \sigma^2}{\gamma_1 \sigma^2 + \gamma_2 x P_D}\exp\left(-\frac{x(1+\tau)}{\gamma_1}\right) + \frac{\gamma_2 P_D}{\tau\gamma_1 P_0 + \gamma_2 P_D} -\right.$$
$$\exp\left(-\frac{x\sigma^2(\gamma_1 \tau P_0 + \gamma_2 P_D)(1+\tau)}{\gamma_2 \gamma_1 P_D(\sigma^2 - x\tau P_0)}\right)$$
$$\left.\left(\frac{\gamma_2 P_D}{\tau\gamma_1 P_0 + \gamma_2 P_D} - \frac{\gamma_2 P_D x}{\gamma_1 \sigma^2 + \gamma_2 P_D x}\right)\right)$$

[Equation 19]

A relation Equation such as the following Equation 20 can be obtained using the above Equation 19 with respect to a transmission power for allowing the probability of outage in D2D communication not to exceed $\epsilon$.

$$f(P_0) \geq A$$ [Equation 20]

In this case, $f(P_0)$ is a function for the transmission power of the cellular user equipment 120 and may be defined as expressed by the following Equation 21.

$$f(P_0) = \frac{\gamma_2 P_D}{\tau\gamma_1 P_0 + \gamma_2 P_D} - \exp\left(-\frac{x\sigma^2(\gamma_1 \tau P_0 + \gamma_2 P_D)(1+\tau)}{\gamma_2 \gamma_1 P_D(\sigma^2 - x\tau P_0)}\right)$$
$$\left(\frac{\gamma_2 P_D}{\tau\gamma_1 P_0 + \gamma_2 P_D} - \frac{\gamma_2 P_D x}{\gamma_1 \sigma^2 + \gamma_2 P_D x}\right)$$

[Equation 21]

Also, in this case, A may be defined as expressed by the following Equation 22.

$$A = (1-\epsilon)\exp\left(\frac{\tau\sigma^2}{\gamma_2 P_D}\right) -$$
$$\frac{\gamma_1 \sigma^2}{\gamma_1 \sigma^2 + \gamma_2 x P_D}\exp\left(-\frac{x(1+\tau)}{\gamma_1}\right)$$

[Equation 22]

Since the transmission power of the cellular user equipment 120 has a maximum value when $f(P_0)=A$, the maximum transmission power of the cellular user equipment 120, which allows the probability of outage in D2D communication not to exceed $\epsilon$, is obtained using a bisection method by a restricted Equation such as the following Equation 23.

$$P_0 \leq P_{\epsilon,2}$$ [Equation 23]

Therefore, in the case that Line 1 and Line 2 have an intersection point, the maximum transmission power of the cellular user equipment 120, which allows the probability of D2D communication not to exceed $\epsilon$, becomes $P_{\epsilon,2}$.

The maximum transmission power of the cellular user equipment 120, which maintains the probability of outage in communication of the D2D receiving user equipment 130 to reach $\epsilon$ or less, may be defined as expressed by the following Equation 24 from the result obtained through the two cases illustrated in FIGS. 2(a) and 2(b).

$$P_0 = \begin{cases} P_{\epsilon,1}, & \text{if } g(x = |h_0|^2) \geq B \\ P_{\epsilon,2}, & \text{if } g(x = |h_0|^2) < B \end{cases}$$

[Equation 24]

In this case, g(x) is a function of channel gain of a cellular uplink, and is given by the following Equation 25.

$$g(x) = C^x + Dx$$ [Equation 25]

In this case, C and D are constants comprised of parameters already known by the cellular user equipment 120, and are given by the following Equations 26 and 27.

$$C = \exp\left(-\frac{(1+\tau)}{\gamma_1}\right)$$ [Equation 26]

$$D = \left(1 - (1-\epsilon)\exp\left(\frac{\tau\sigma^2}{\gamma_2 P_D}\right)\right)\frac{\gamma_2 P_D}{\gamma_1 \sigma^2}$$ [Equation 27]

Also, B means a threshold value for determining the maximum transmission power of the cellular user equipment 120, and B is a constant comprised of parameters already known by the cellular user equipment 120, and is given by the following Equation 28.

$$B = (1-\epsilon)\exp\left(\frac{\tau\sigma^2}{\gamma_2 P_D}\right)$$ [Equation 28]

The transmission power of the cellular user equipment 120 cannot exceed a maximum instantaneous power $P_{max}$. Therefore, the transmission power of the cellular user equipment 120, which maintains the probability of outage in D2D communication to reach $\epsilon$ or less when channels follow Rayleigh distribution and maximizes an uplink transmission rate, may finally be defined as expressed by the following Equation 29.

$$P_0^* = \begin{cases} \min(P_{\epsilon,1}, P_{max}), & \text{if } g(x = |h_0|^2) \geq B \\ \min(P_{\epsilon,2}, P_{max}), & \text{if } g(x = |h_0|^2) < B \end{cases} \quad \text{[Equation 29]}$$

In the case that channels follow Rayleigh distribution, the cellular user equipment 120 estimates an uplink channel $h_0$ directly through channel estimation. $g(|h_0|^2)$ is compared with a threshold value B by using a gain value of a corresponding channel, and one of $P_{\epsilon,1}$, $P_{\epsilon,2}$ and $P_{max}$ is selectively used as the transmission power. Also, in the same manner, one of $P_{\epsilon,1}$, $P_{\epsilon,2}$ and $P_{max}$ may be selected using channel information owned by the base station 110, and may be designated as the transmission power for the cellular user equipment 120.

In more normalized description, the cellular user equipment 120 may obtain a threshold value B and a function g(x) used for determination on the basis of long term statistic information of a channel which is previously acquired prior to transmission. In this case, types of B and g(x) are determined depending on distribution of channels. Also, the base station 110 or the cellular user equipment 120 may obtain maximum transmission powers $P_{\epsilon,1}$ and $P_{\epsilon,2}$, which maintain the probability of outage in D2D communication to reach $\epsilon$ or less, by using channel distribution considering all cases where the D2D receiving user equipment 130 uses SIC and SUD, in the same manner as the aforementioned Rayleigh fading channel. Finally, the cellular user equipment 120 estimates an uplink channel $h_0$ through channel estimation and compares $g(|h_0|^2)$ with the threshold value B by using a gain value of the channel, thereby using one of $P_{\epsilon,1}$, $P_{\epsilon,2}$ and $P_{max}$ as the transmission power. Also, the base station 110 may directly select one of $P_{\epsilon,1}$, $P_{\epsilon,2}$ and $P_{max}$ as above by considering calculation complexity of the cellular user equipment 120 and designate the selected one as the transmission power for the cellular user equipment 120, and the cellular user equipment 120 may transmit information by using the transmission power designated from the base station 110.

In the power control method suggested as above, the cellular user equipment 120 uses all powers available for maximizing its amount of transmission to increase a transmission rate. Therefore, the cellular user equipment 120 transmits information at a transmission rate of $R_0$ that can transmit maximum data when a power of $P_0$ is used. As a result, if the D2D receiving user equipment 130 recovers information through SUD, the cellular user equipment 120 can achieve a maximum transmission rate. However, as described above, in the case that the D2D receiving user equipment 130 uses SIC, a condition that the D2D receiving user equipment 130 should first recover interference transmitted at a transmission rate of $R_0$ is applied to this case. For this reason, if the cellular user equipment 120 transmits information at a maximum transmission rate, it is difficult for the D2D receiving user equipment 130 to successfully recover interference. Therefore, if the cellular user equipment 120 transmits information by using a transmission rate of $r_0$ lower than the maximum transmission rate of $R_0$ without transmitting information by using the power of $P_0$ and the maximum transmission rate of $R_0$, the D2D receiving user equipment 130 may effectively use SIC, whereby more advanced performance may be expected. In the case that the D2D receiving user equipment 130 may use SIC as above, the power of $P_0$, which assures the probability of outage in D2D communication and at the same time maximizes the transmission rate of the cellular user equipment 120, and the transmission rate $r_0$ ($\leq R_0$) are obtained as follows. In the case that the D2D receiving user equipment 130 that enables SIC and the D2D receiving user equipment 130 that enables SUD only coexist in the system, the base station 110 acquires information as to whether the corresponding D2D receiving user equipment 130 enables SIC. Afterwards, the base station 110 may forward the acquired information to the cellular user equipment 120 to assist that the cellular user equipment 120 selects the transmission power and the transmission rate, or may directly determine the transmission power and the transmission rate on the basis of the acquired information and designate the determined transmission power and transmission rate for the cellular user equipment 120.

As described above, in the case that the D2D receiving user equipment 130 recovers its information in accordance with the present invention, the power can be controlled effectively even in a state that the SIC scheme is used as well as the case where the SUD scheme is used, and the transmission rate of the cellular user equipment 120 can be maximized while the probability of outage in D2D communication is assured at a certain level or less.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

In this specification, the embodiments of the present invention have been described based on data transmission and reception between a relay node and the base station 110. In this specification, a specific operation which has been described as being performed by the base station 110 may be performed by an upper node of the base station as the case may be. In other words, it will be apparent that various operations performed for communication with the user equipment in the network which includes a plurality of network nodes along with the base station 110 may be performed by the base station 110 or network nodes other than the base station 110. At this time, the base station 110 may be replaced with terminologies such as a fixed station, Node B, eNode B (eNB), and an access point (AP).

The embodiments according to the present invention may be implemented by various means, for example, hardware, firmware, software, or their combination. If the embodiments according to the present invention are implemented by hardware, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiments according to the present invention are implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Although the aforementioned method for receiving a downlink signal in a user equipment in a base station 110 cooperative wireless communication system and the aforementioned apparatus therefor have been described based on the 3GPP LTE system, the aforementioned method and apparatus may be applied to various wireless communication systems in addition to the 3GPP LTE system.

The invention claimed is:

1. A power control method performed by a user equipment to assure quality of service of a device-to-device (D2D) communication, the power control method comprising:
   receiving, from a base station, information that includes at least one of channel information and information of a receiving side user equipment in the D2D communication;
   estimating a channel gain value of an uplink channel based on the received information; and
   selecting a transmission power by comparing the channel gain value of the uplink channel with a threshold value for determining a maximum transmission power, and transmitting data to the base station by using the selected transmission power,
   wherein when the channel gain value of the uplink channel is greater than or equal to the threshold value, the selected transmission power is determined to be a smaller value of a first transmission power and a maximum instantaneous power,
   wherein when the channel gain value of the uplink channel is smaller than the threshold value, the selected transmission power is determined to be a smaller value of a second transmission power and the maximum instantaneous power,
   wherein the threshold value is determined as a function of a probability of outage in the D2D communication, a received power of the D2D communication, and long term statistic information for the D2D communication, and
   wherein the channel information includes at least one of channel information of the D2D communication, uplink channel information between the user equipment and the base station, and interference channel information between the user equipment and the receiving side user equipment in the D2D communication.

2. The power control method according to claim 1, wherein at least one of channel information of the D2D communication, uplink channel information between the user equipment and the base station, and interference channel information between the user equipment and the receiving side user equipment in the D2D communication is long term statistic information.

3. The power control method according to claim 1, wherein at least one of a channel of the D2D communication, an uplink channel between the user equipment and the base station and an interference channel between the user equipment and the receiving side user equipment in the D2D communication follows Rayleigh distribution.

4. The power control method according to claim 1, wherein the channel information of the D2D communication is received from the receiving side user equipment in the D2D communication.

5. The power control method according to claim 1, wherein the information of the receiving side user equipment in the D2D communication includes information on information recovery of the receiving side user equipment, and information in the receiving side user equipment is recovered through at least one of single user decoding (SUD) and successive interference cancellation (SIC).

6. The power control method according to claim 5, wherein a transmission rate of data transmitted from the user equipment through an uplink is a maximum transmission rate or less when the information of the receiving side user equipment is recovered through SIC.

7. A power control method performed by a user equipment to assure quality of service of a device-to-device (D2D) communication, the power control method comprising:
   receiving, from a base station, information as to a transmission power for transmitting data; and
   transmitting the data to the base station by using the transmission power,
   wherein the transmission power is a value selected by the base station by comparing a channel gain value of an uplink channel, which is calculated based on at least one of channel information and information of a receiving side user equipment in the D2D communication, with a threshold value for determining a maximum transmission power,
   wherein when the channel gain value of the uplink channel is greater than or equal to the threshold value, the selected transmission power is determined to be a smaller value of a first transmission power and a maximum instantaneous power,
   wherein when the channel gain value of the uplink channel is smaller than the threshold value, the selected transmission power is determined as a smaller value of a second transmission power and the maximum instantaneous power,
   wherein the threshold value is determined as a function of a probability of outage in the D2D communication, a received power of the D2D communication, and long term statistic information for the D2D communication, and
   wherein the channel information includes at least one of channel information of the D2D communication, uplink channel information between the user equipment and the base station, and interference channel information between the user equipment and the receiving side user equipment in the D2D communication.

8. The power control method according to claim 7, wherein the information of the receiving side user equipment in the D2D communication includes information on information recovery of the receiving side user equipment, and information in the receiving side user equipment is recovered through at least one of single user decoding (SUD) and successive interference cancellation (SIC).

9. The power control method according to claim 8, wherein a transmission rate of data transmitted from the user equipment through an uplink is a maximum transmission rate or less when the information of the receiving side user equipment is recovered through SIC.

10. The power control method according to claim 9, further comprising the step of receiving information on the transmission rate of the data from the base station.

* * * * *